US009331598B2

(12) United States Patent
Jeong et al.

(10) Patent No.: US 9,331,598 B2
(45) Date of Patent: May 3, 2016

(54) POWER FACTOR CORRECTION DEVICE, POWER SUPPLY, AND MOTOR DRIVER

(71) Applicant: SAMSUNG ELECTRO-MECHANICS CO., LTD., Suwon, Gyunggi-do (KR)

(72) Inventors: In Wha Jeong, Gyunggi-do (KR); Bum Seok Suh, Gyunggi-do (KR); Min Gyu Park, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 224 days.

(21) Appl. No.: 13/782,830

(22) Filed: Mar. 1, 2013

(65) Prior Publication Data

US 2014/0152208 A1    Jun. 5, 2014

(30) Foreign Application Priority Data

Dec. 5, 2012    (KR) .................. 10-2012-0140171

(51) Int. Cl.
  *H02P 1/24*       (2006.01)
  *H02M 7/217*      (2006.01)
  *H02M 1/42*       (2007.01)
  *H02M 3/158*      (2006.01)

(52) U.S. Cl.
  CPC .......... *H02M 7/2176* (2013.01); *H02M 1/4225* (2013.01); *H02M 3/1584* (2013.01); *Y02B 70/126* (2013.01)

(58) Field of Classification Search
  USPC ............... 318/400.3, 729, 438, 608; 323/210, 323/211, 207, 222, 282, 223, 286, 284; 363/44, 21.04, 127, 125; 320/107, 137
  See application file for complete search history.

(56) References Cited

U.S. PATENT DOCUMENTS

| 5,418,704 A * | 5/1995 | Hua et al. ...................... 323/282 |
| 8,432,710 B2 * | 4/2013 | Yamada ........................... 363/44 |
| 8,467,212 B2 * | 6/2013 | Mino et al. .................... 363/127 |
| 8,952,667 B2 | 2/2015 | Ohshita et al. |
| 2004/0136133 A1 * | 7/2004 | Youm .......................... 361/91.1 |

(Continued)

FOREIGN PATENT DOCUMENTS

| CN | 102640407 A | 8/2012 |
| JP | 2000-333463 A | 11/2000 |

(Continued)

OTHER PUBLICATIONS

Office Action Japanese Patent Application No. 2013-036066 dated Feb. 18, 2014 with English translation.

(Continued)

*Primary Examiner* — Shawki S Ismail
*Assistant Examiner* — Jorge L Carrasquillo
(74) *Attorney, Agent, or Firm* — McDermott Will & Emery LLP

(57) ABSTRACT

There is provided a power factor correction device including, a first switch switching input power to adjust a phase difference between a current and a voltage of the input power, a second switch switched on before the first switch is switched on to form a transfer path for residual power in the first switch, a first inductor charging and discharging energy according to switching of the first switch, and a second inductor adjusting an amount of current flowing through the second switch according to switching of the second switch, wherein the first inductor and the second inductor are inductively coupled.

13 Claims, 5 Drawing Sheets

(56) References Cited

U.S. PATENT DOCUMENTS

| | | | |
|---|---|---|---|
| 2012/0025779 A1* | 2/2012 | Xu et al. ..................... 320/129 |
| 2012/0039094 A1* | 2/2012 | Shin ................... H02M 1/4225 363/21.04 |
| 2012/0187929 A1* | 7/2012 | Ohshita ............... H02M 3/1584 323/272 |
| 2012/0250363 A1* | 10/2012 | Skinner ..................... 363/21.12 |
| 2012/0262958 A1* | 10/2012 | Feldtkeller .......... H02M 1/4208 363/44 |
| 2013/0235631 A1* | 9/2013 | Pahlevaninezhad .... H02M 1/42 363/126 |

FOREIGN PATENT DOCUMENTS

| | | | |
|---|---|---|---|
| JP | 2003-164149 A | | 6/2003 |
| JP | 2003164149 A | * | 6/2003 |
| KR | 10-0292489 B1 | | 3/2001 |
| KR | 10-2002-0074245 A | | 9/2002 |
| KR | 20020074245 A | * | 9/2002 |
| KR | 20020074245 A | * | 9/2002 |

OTHER PUBLICATIONS

Office Action Korean Patent Application No. 10-2012-0140171 dated Nov. 28, 2013 with full English translation.

Chinese Office Action dated Oct. 26, 2015, issued in corresponding Chinese Patent Application No. 201310079807.4. (w/ English translation).

* cited by examiner

POWER FACTOR CORRECTION DEVICE, POWER SUPPLY, AND MOTOR DRIVER

CROSS-REFERENCE TO RELATED APPLICATIONS

This application claims the priority of Korean Patent Application No. 10-2012-0140171 filed on Dec. 5, 2012, in the Korean Intellectual Property Office, the disclosure of which is incorporated herein by reference.

BACKGROUND OF THE INVENTION

1. Field of the Invention

The present invention relates to a power factor correction device to which a coupled inductor is applied, a power supply, and a motor driver.

2. Description of the Related Art

Recently, national governments around the world have urged the effective use of energy in conformity with energy efficiency policies, and in particular, effective use of energy in electronic products or home appliances is widely recommended.

To efficiently use energy according to such recommendations, a remedial circuit for the efficient use of energy is used in a power supply that supplies power to electronic devices and household electrical appliances.

An example of a remedial circuit is a power factor correction circuit, which switches input power to adjust a phase difference (power factor) between a current and a voltage of the input power to effectively transfer power to a rear stage.

However, a power factor correction circuit may also have a problem in that a spike voltage may be generated when switching the input power.

Meanwhile, a motor is frequently employed in electronic devices and electric household appliances to carry out a previously set operation, and to drive the motor, an appropriate amount of power has to be supplied. Here, a power factor correction circuit for improving energy efficiency is applied to a power supply for supplying power to thereby switch input power and adjust a phase difference between a current and a voltage of the input power. However, in this case, a spike voltage may also be generated when switching the input power.

The related art document below relates to a power factor correction circuit that uses snubber power to improve a power factor by using energy accumulated in an inductor of a snubber circuit unit, but does not disclose a method of reducing a spike voltage that occurs when switching is performed.

RELATED ART DOCUMENT

Korean Patent Laid-Open Publication No. 1999-0058753

SUMMARY OF THE INVENTION

An aspect of the present invention provides a power factor correction device in which a current path for a current flowing through a snubber inductor may be provided when a snubber switch is turned off, a power supply, and a motor driver.

Another aspect of the present invention provides a power factor correction device in which a high spike voltage, occurring when a snubber switch is turned off, may be reduced, a power supply, and a motor driver.

Another aspect of the present invention provides a power factor correction device in which an electromagnetic interference (EMI) noise level may be reduced, a power supply, and a motor driver.

According to an aspect of the present invention, there is provided a power factor correction device including: a first switch switching input power to adjust a phase difference between a current and a voltage of the input power; a second switch switched on before the first switch is switched on to form a transfer path for residual power in the first switch; a first inductor charging and discharging energy according to switching of the first switch; and a second inductor adjusting an amount of current flowing through the second switch according to switching of the second switch, wherein the first inductor and the second inductor are inductively coupled.

The first inductor and the second inductor may be inductively coupled in a differential mode.

The power factor correction device may further include a magnetic core shared by the first inductor and the second inductor.

The magnetic core may include at least one of an iron core and a ferrite core.

The power factor correction device may further include: a diode providing a transfer path for power emitted from the first inductor according to the switching of the first switch; and a capacitor stabilizing the power transferred from the diode.

The input power may be rectified power.

The second switch may be switched on or off before the first switch is switched on.

The second switch may be switched on before the first switch is switched on, and may be switched off after the first switch is switched on.

The power factor correction device may further include a control unit that outputs a control signal for the first switch and the second switch.

The first switch and the second switch may include at least one of a transistor, an insulated gate bipolar transistor (IGBT) and a metal oxide semiconductor field-effect transistor (MOS-FET).

According to another aspect of the present invention, there is provided a power factor correction device including: a first switch switching input power to adjust a phase difference between a current and a voltage of the input power; a second switch switched on before the first switch is switched on so as to form a transfer path for residual power in the first switch; a first inductor connected between a power input terminal for supplying the input power and the first switch; and a second inductor connected between a connection terminal between the first switch and the first inductor, and the second switch, wherein the first inductor and the second inductor are inductively coupled.

According to another aspect of the present invention, there is provided a power supply including: a power factor correction circuit including a first inductor charging and discharging energy according to switching of a first switch and a second inductor adjusting an amount of current flowing through a second switch according to switching of the second switch inductively coupled to the first switch; a power converting unit switching power from the power factor correction circuit to convert the power to a previously set power; and a switching control unit controlling power switching of the power converting unit.

The first inductor and the second inductor may be inductively coupled in a differential mode.

The power supply may further include a magnetic core shared by the first inductor and the second inductor.

The magnetic core may include at least one of an iron core and a ferrite core.

According to another aspect of the present invention, there is provided a motor driver including: a power factor correction circuit including a first inductor charging and discharging energy according to switching of a first switch and a second inductor adjusting an amount of current flowing through a second switch according to switching of the second switch inductively coupled to the first switch; a driver switching power from the power factor correction circuit to drive a motor; and a driving control unit controlling power switching of the driver.

The first inductor and the second inductor may be inductively coupled in a differential mode.

The motor driver may further include a magnetic core shared by the first inductor and the second inductor.

The magnetic core may include at least one of an iron core and a ferrite core.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
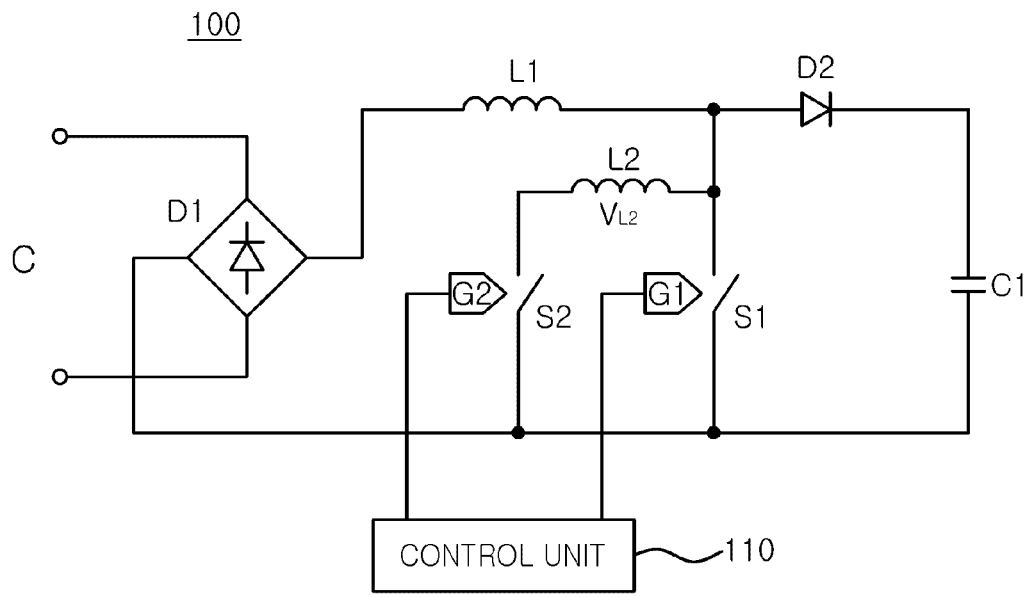
FIG. 1 is a schematic circuit diagram of a power factor correction circuit.

FIG. 1 is a schematic circuit diagram of a power factor correction circuit 100.

Referring to FIG. 1, the power factor correction circuit 100 may include a main switch S1 and an auxiliary switch S2, and may further include first and second inductors L1 and L2, a diode D2, and a capacitor C1.

The main switch S1 switches an input power to adjust a phase difference between a voltage and a current of the input power to thereby correct a power factor.

The first inductor L1 may be connected between a power input terminal and the main switch S1 to accumulate or emit energy according to switching of the main switch S1. For example, when the main switch S1 is configured of a transistor, the first inductor L1 may be connected between the power input terminal and a collector of the main switch S1.

The input power may be rectified power, and accordingly, a rectification circuit D1 may rectify alternating current (AC) power and transfer the input power to the power factor correction circuit.

The auxiliary switch S2 may be connected between the second inductor L2 and a ground. Meanwhile, when the main switch S1 and the auxiliary switch S2 are transistors, the second inductor L2 may be connected between the collector of the main switch S1 and a collector of the auxiliary switch S2.

The diode D2 may be connected between the first inductor L1 and an output terminal, thereby providing a transfer path for power output according to switching of the main switch S1.

The capacitor C1 may be connected to the output terminal in parallel to stabilize output power.

The control unit 110 may provide switching control signals G1 and G2 that control switching on and off operations of the main switch S1 and the auxiliary switch S2.

The main switch S1 of the power factor correction circuit 100 adjusts a phase difference between a voltage and a current of input power by switching the input power so as to correct a power factor. Here the auxiliary switch S2 may form a transfer path for residual power remaining during switching the main switch S1 on or off.

Figure 2:
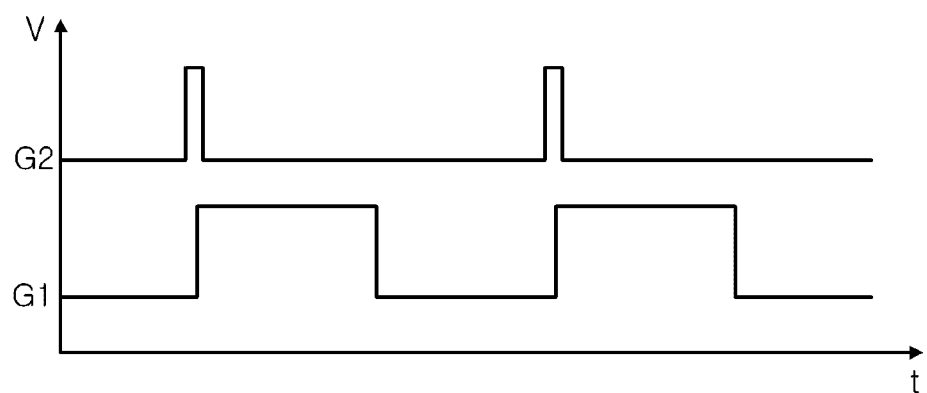
FIG. 2 is a graph illustrating switching control signals of a main switch and an auxiliary switch used in a power factor correction circuit.

FIG. 2 is a graph illustrating the switching control signals G1 and G2 of the main switch S1 and the auxiliary switch S2 used in the power factor correction circuit.

Referring to FIGS. 1 and 2, the auxiliary switch S2 of the power factor correction circuit 100 may form a transfer path for the residual power before switching the main switch S1 on. That is, the auxiliary switch S2 may bypass the residual power to a ground.

To this end, the control unit 110 may transfer switching control signals G1 and G2 that switch the auxiliary switch S2 on before the main switch S1 is switched on.

The control unit 110 may switch the auxiliary switch S2 on or off before switching the main switch S1 on. Alternatively, the control unit 110 may switch the auxiliary switch S2 on before switching the main switch S1 on, and then switch the auxiliary switch S2 off after the main switch S1 is switched on.

The control unit 110 may switch the auxiliary switch S2 on, and then after a voltage applied to both terminals of the main switch S1 becomes a zero voltage, the control unit 110 may switch the auxiliary switch S2 off.

Figure 3:
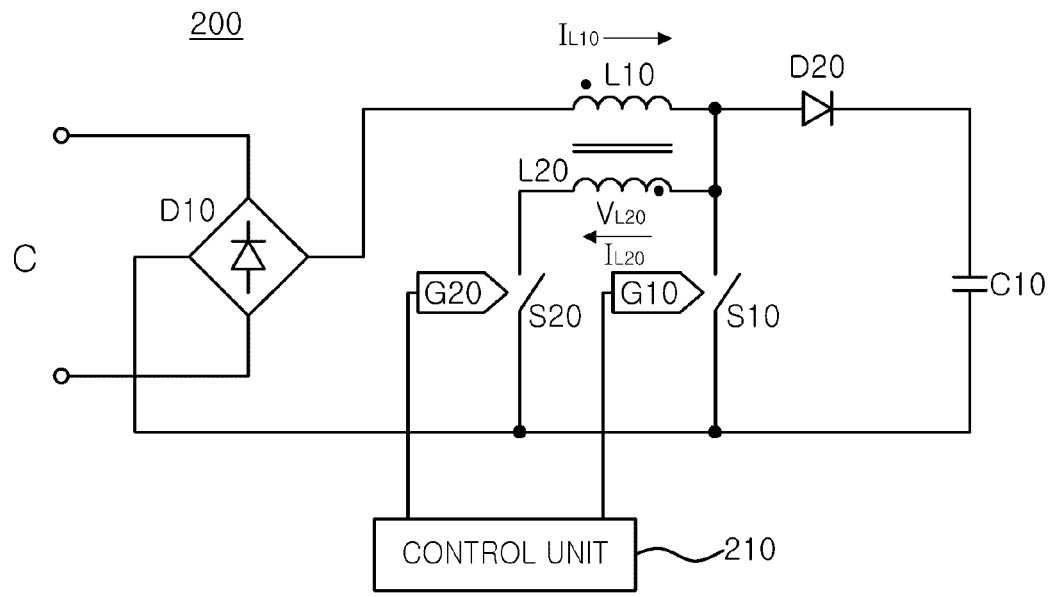
FIG. 3 illustrates a power factor correction device according to an embodiment of the present invention.

FIG. 3 illustrates a power factor correction device 200 according to an embodiment of the present invention.

Referring to FIG. 3, the power factor correction device 200 may include a main switch S10 and an auxiliary switch S20, and may further include first and second inductors L10 and L20, a diode D20, and a capacitor C10.

Meanwhile, for convenience of description, the main switch S10 may be defined as a first switch, and the auxiliary switch S20 may be defined as a second switch.

The main switch S10 may switch input power to adjust a phase difference between a voltage and a current of the input power, thereby correcting a power factor.

The first inductor L10 may be connected between a power input terminal and the main switch S10. For example, when the main switch S10 is configured of a transistor, the first inductor L10 may be connected between the power input terminal and a collector of the main switch S10.

In addition, the first inductor L10 may accumulate or emit energy according to switching of the main switch S10.

The input power may be rectified power. For example, a rectification circuit D10 may rectify alternating current (AC) power and transfer the input power to the power factor correction circuit.

The auxiliary switch S20 may be switched on before the main switch S10 is switched on to thereby form a transfer path for residual power in the first switch.

Also, the auxiliary switch S20 may be connected between the second inductor L20 and a ground. Meanwhile, when the main switch S10 and the auxiliary switch S20 are transistors, the second inductor L20 may be connected between a collector of the main switch S10 and a collector of the auxiliary switch S20.

The diode D20 may be connected between the first inductor L10 and an output terminal to thereby provide a transfer path for power output from the first inductor L10 according to switching of the main switch S10.

The capacitor C10 may be connected to an output terminal in parallel to stabilize power transferred from the diode D20.

A control unit 210 may output switching control signals G10 and G20 that control switching on and off operations of the main switch S10 and the auxiliary switch S20.

The main switch S10 of the power factor correction device 200 switches input power to adjust a phase difference between a voltage and a current of the input power to thereby correct a power factor. Here, the auxiliary switch S20 may form a transfer path for residual power remaining during switching the main switch S10 on or off.

Meanwhile, according to an embodiment of the present invention, the first inductor L10 and the second inductor L20 may be inductively coupled.

In addition, according to an embodiment of the present invention, the first inductor L10 and the second inductor L20 may be inductively coupled in a differential mode. A differential mode refers to a state in which the first inductor L10 and the second inductor L20 are coupled with opposite polarities. For example, by a second current $I_{L20}$ of the second inductor L20, a first current $I_{L10}$ may be induced to the first inductor L10.

Also, according to an embodiment of the present invention, the first inductor L10 and the second inductor L20 may share a single core.

When the first inductor L10 and the second inductor L20 share a single core, mounting space for inductors in the power factor correction device and manufacturing costs may be saved.

The core may be a magnetic core. The magnetic core may be an iron core or a ferrite core.

Figure 4:
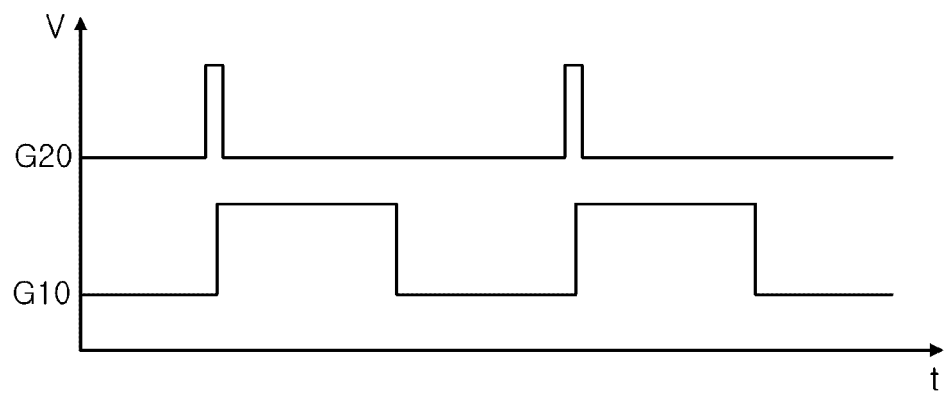
FIG. 4 is a graph illustrating switching control signals according to an embodiment of the present invention.

FIG. 4 is a graph illustrating switching control signals G10 and G20 according to an embodiment of the present invention.

Referring to FIGS. 3 and 4, the auxiliary switch S20 of the power factor correction device 200 may form a transfer path for the residual power before switching the main switch S10 on. That is, the auxiliary switch S20 may bypass the residual power to a ground.

To this end, the control unit 210 may transfer switching control signals G10 and G20 that switch the auxiliary switch S20 on before switching the main switch S10 on.

Then, the control unit 210 may switch the auxiliary switch S20 on or off before switching the main switch S10 on.

In addition, the control unit 210 may switch the auxiliary switch S20 on before switching the main switch S10 on, and then, after the main switch S10 is switched on, the control unit 210 may switch the auxiliary switch S20 off.

The control unit 210 may switch the auxiliary switch S20 on, and generate a zero voltage switching condition of the main switch S10, and then may switch the auxiliary switch S20 off.

Referring to FIGS. 1 and 2, when the auxiliary switch S2 is switched off, a relatively very high spike voltage may be generated in both terminals of the auxiliary switch S2 because there is no current path through which a current flowing through the auxiliary switch S2 is to be flow during a switching off operation of the auxiliary switch S2. In particular, when a load current proceeding to the diode D2 is relatively high, a spike voltage higher than a rated voltage of the second switch S2 may be generated.

Referring to FIGS. 3 and 4, the power factor correction device according to an embodiment of the present invention may transfer energy stored in the second inductor L20 to a current path for the first inductor L10 when the auxiliary switch S20 is switched off.

As described above, due to energy coupling between the second inductor L20 and the first inductor L10, a spike voltage may be limited to a low value.

FIG. 5 is a graph illustrating a waveform of main portions of the power factor correction device.

Figure 5A:
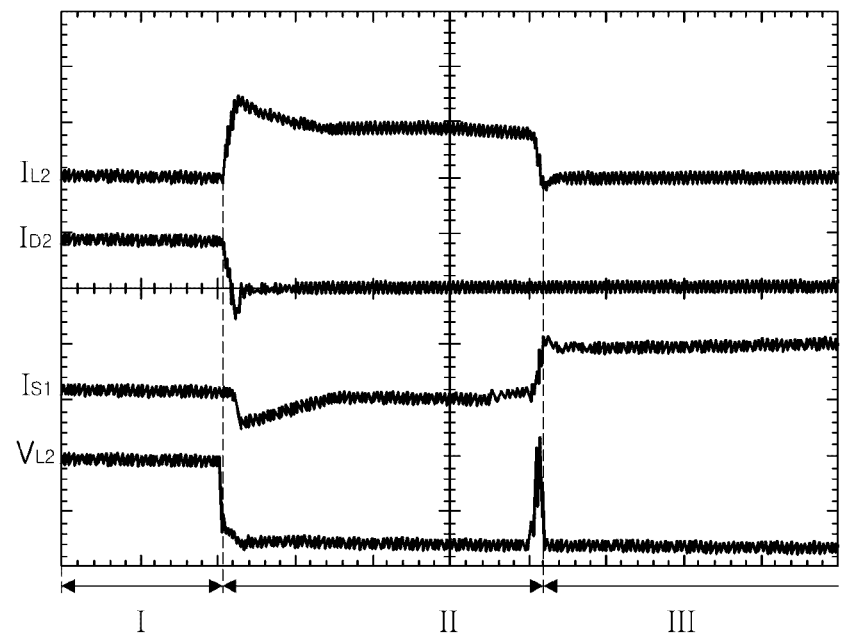
FIG. 5A and FIG. 5B are graphs which illustrate a waveform of main portions of the power factor correction device.

FIG. 5A is a waveform graph illustrating main portions of the circuit illustrated in FIG. 1.

Figure 5B:
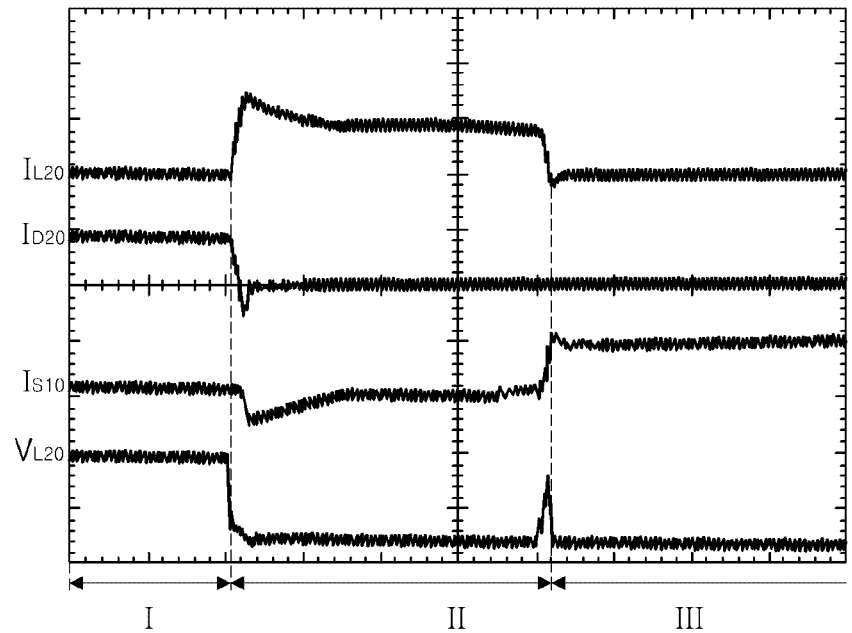

FIG. 5B is a waveform graph illustrating main portions of the circuit illustrated in FIG. 3.

Referring to FIG. 5, section I denotes a switching-off state of the auxiliary switches S2 and S20 and a switching-off state of the main switches S1 and S10.

In addition, section II denotes a switching-on state of the auxiliary switches S2 and S20.

Also, section III denotes a switching-off state of the auxiliary switches S2 and S20, and a switching-on state of the main switches S1 and S10.

In section I, a current $I_{L2}$ or $I_{L20}$ does not flow through auxiliary inductor L2 or L20, but a current $I_{D2}$ or $I_{D20}$ flows to an output terminal, and a current $I_{S1}$ or $I_{S10}$ does not flow through the main switches S1 or S10.

In section II, the auxiliary switches S2 or S20 is switched on so that a current $I_{L2}$ or $I_{L20}$ flows through the auxiliary inductor L2 or L20, and a current $I_{D2}$ or $I_{D20}$ to an output terminal is blocked, and a current $I_{S1}$ or $I_{S10}$ does not flow to the main switches S1 or S10.

In section III, the auxiliary switch S2 is switched off, and when the auxiliary switch S2 is switched off, a relatively very high spike voltage may be generated in both terminals of the auxiliary switch S2 because there is no current path for a current, through which the current flowing through the auxiliary switch S2 is to flow, during the switching off operation of the auxiliary switch S2 (see FIG. 5A).

On the other hand, according to the power factor correction device 200 of the current embodiment of the present invention, when the auxiliary switch S20 is switched off, energy stored in the second inductor L20 may be transferred to the current path for the first inductor L10.

As described above, due to energy coupling between the second inductor L20 and the first inductor L10, a spike voltage may be limited to a low value.

Referring to FIG. 5B, it can be seen that the power factor correction device 200 according to the current embodiment of the present invention significantly reduces a spike voltage (please refer to $V_{L2}$, $V_{L20}$).

Figure 6:
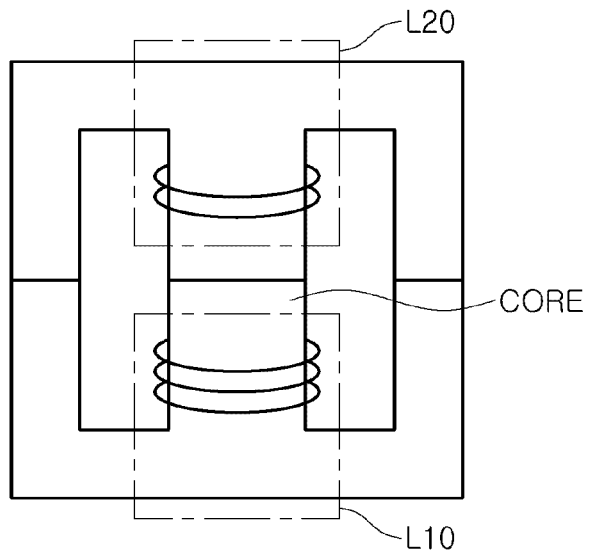
FIG. 6 is a schematic view of a first inductor and a second inductor according to an embodiment of the present invention.

FIG. 6 is a schematic view of a first inductor L10 and a second inductor L20 according to an embodiment of the present invention.

According to an embodiment of the present invention, the first inductor L10 and the second inductor L20 may share a single core.

When the first inductor L10 and the second inductor L20 share a single core, amounting space for inductors in the power factor correction device and manufacturing costs may be saved.

The core may be a magnetic core. The magnetic core may be an iron core or a ferrite core.

Figure 7:
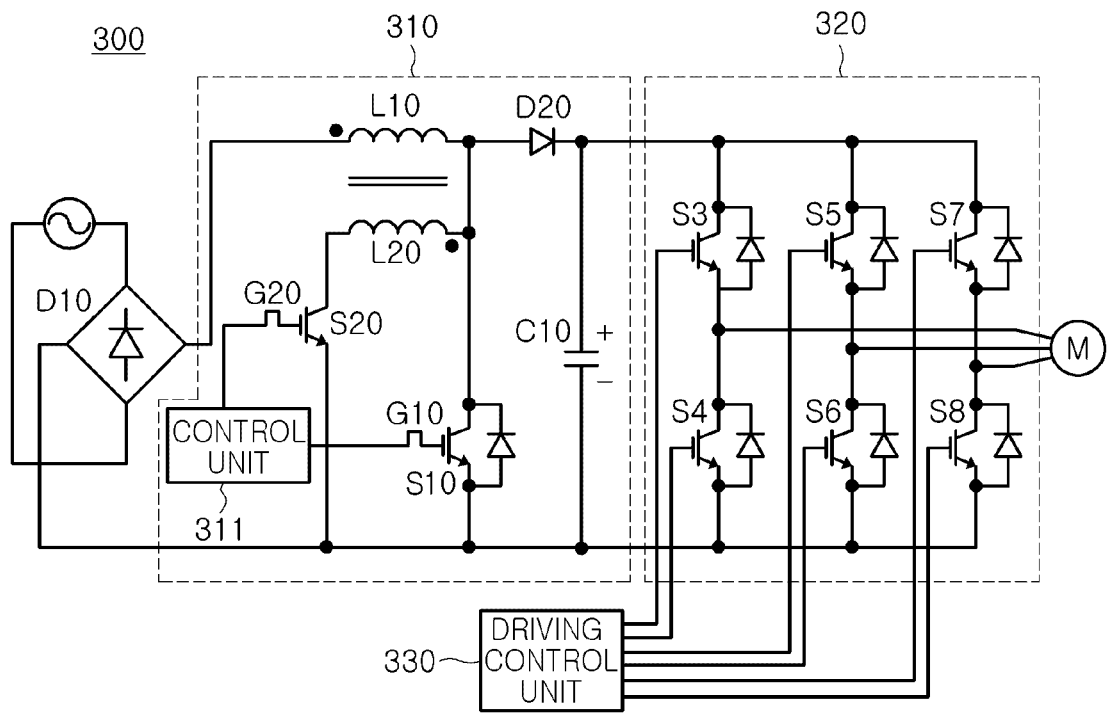
FIGS. 7 and 8 illustrate a motor driver according to embodiments of the present invention.
Figure 8:
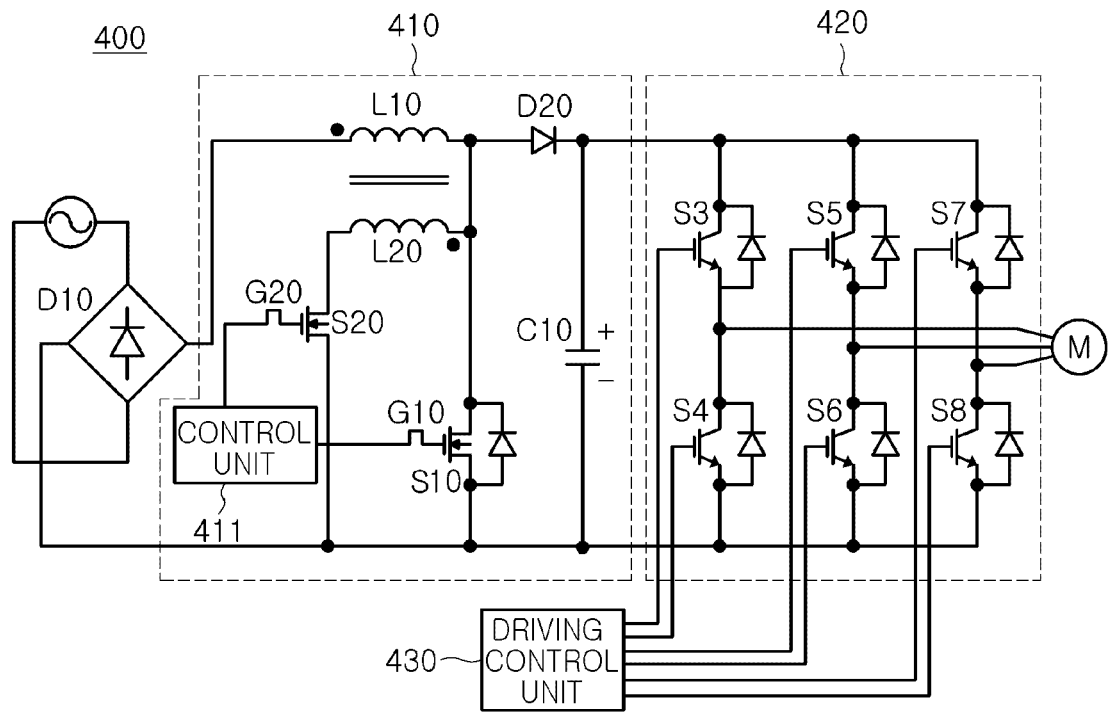

FIGS. 7 and 8 illustrate a motor driver according to an embodiment of the present invention.

Referring to FIGS. 7 and 8, motor drivers 300 and 400 may respectively include power factor correction circuits 310 and 410, drivers 320 and 420, and driving control units 330 and 430. The power factor correction circuits 310 and 410 are identical to the power factor correction device 200 illustrated in FIG. 3, and thus a description thereof will be omitted.

Referring to FIGS. 7 and 8, a main switch S10 and an auxiliary switch S20 of the power factor correction circuits 310 and 410 may be configured of an insulated gate bipolar transistor (IGBT) 310 or a metal oxide semiconductor field-effect transistor (MOS-FET) 410.

The drivers 320 and 420 may receive power of which a power factor has been corrected, from the power factor correction circuits 310 and 410 to switch the power according to a control signal to thereby drive a motor M. Here, while the motor M is driven by supplying three-phase power, the motor may also be driven by a single phase power.

The driving control units 330 and 430 may control switching of power, of which a power factor has been corrected, from the power factor correction circuits 310 and 410, to thereby control driving of the motor M.

Figure 9:
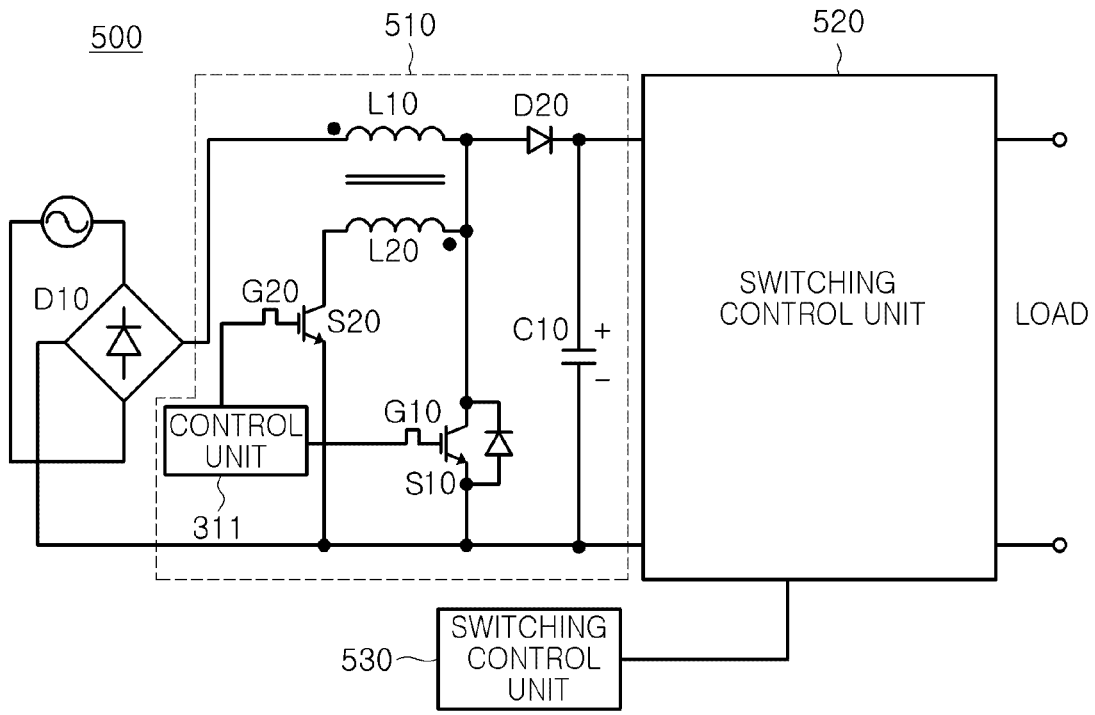
FIG. 9 illustrates a power supply according to an embodiment of the present invention.

FIG. 9 illustrates a power supply 500 according to an embodiment of the present invention.

Referring to FIG. 9, the power supply 500 may include a power factor correction circuit 510, a power converting unit 520, and a switching control unit 530.

The power factor correction circuit 510 is identical to the power factor correction device 200 illustrated in FIG. 3, and thus a detailed description thereof will be omitted.

Also, a main switch S10 and an auxiliary switch S20 of the power factor correction circuit 510 may be configured of an IGBT or a MOS-FET as illustrated in FIGS. 7 and 8.

The power converting unit 520 may switch DC power from the power factor correction circuit 510 to perform conversion into DC power having a predetermined voltage level and supply the same to a load, and the switching control unit 530 may control switching of the power conversion unit 520 according to a voltage or current level of the output DC power.

According to the embodiments of the present invention, residual power may be transferred to a ground before switching for power correction, and thus, zero voltage switching for power factor correction is secured. Accordingly, switching loss caused during power factor correction switching may be reduced.

In addition, according to the embodiments of the present invention, the first inductor L10 and the second inductor L20 may be inductively coupled to provide a current path for energy stored in the second inductor L20 when the auxiliary switch S20 is turned off. Accordingly, according to the embodiments of the present invention, a high spike voltage which is generated when the auxiliary switch S20 is turned off may be reduced. Also, according to the embodiments of the present invention, an EMI noise level may be reduced according to the above-described configuration.

Also, according to the embodiments of the present invention, as the first inductor L10 and the second inductor L20 share a core, mounting space for inductors and manufacturing costs may be saved.

As set forth above, according to the embodiments of the present invention, a power factor correction device in which a current path for a current flowing through a snubber inductor may be provided when a snubber switch is turned off, a power supply, and a motor driver may be provided.

Also, according to the embodiments of the present invention, a power factor correction device in which a high spike voltage, occurring when a snubber switch is turned off, may be reduced, a power supply, and a motor driver may be provided.

Also, according to the embodiments of the present invention, a power factor correction device in which an EMI noise level may be reduced, a power supply, and a motor driver may be provided.

While the present invention has been shown and described in connection with the exemplary embodiments, it will be apparent to those skilled in the art that modifications and variations can be made without departing from the spirit and scope of the invention as defined by the appended claims.

What is claimed is:

1. A power factor correction device comprising:
    a first switch switching input power to adjust a phase difference between a current and a voltage of the input power;
    a second switch switched on before the first switch is switched on to form a transfer path for residual power in the first switch;
    a first inductor charging and discharging energy according to switching of the first switch; and
    a second inductor adjusting an amount of current flowing through the second switch according to switching of the second switch, the second inductor directly connected to the second switch,
    wherein the first inductor and the second inductor are inductively coupled.

2. The power factor correction device of claim 1, wherein the first inductor and the second inductor are inductively coupled in a differential mode.

3. The power factor correction device of claim 1, further comprising a magnetic core shared by the first inductor and the second inductor.

4. The power factor correction device of claim 3, wherein the magnetic core includes at least one of an iron core and a ferrite core.

5. The power factor correction device of claim 1, further comprising:
    a diode providing a transfer path for power emitted from the first inductor according to the switching of the first switch; and
    a capacitor stabilizing the power transferred from the diode.

6. The power factor correction device of claim 1, wherein the input power is rectified power.

7. The power factor correction device of claim 1, wherein the second switch is switched on or off before the first switch is switched on.

8. The power factor correction device of claim 1, wherein the second switch is switched on before the first switch is switched on, and is switched off after the first switch is switched on.

9. The power factor correction device of claim 1, further comprising a control unit that outputs a control signal for the first switch and the second switch.

10. The power factor correction device of claim 1, wherein the first switch and the second switch include at least one of a transistor, an insulated gate bipolar transistor (IGBT) and a metal oxide semiconductor field-effect transistor (MOSFET).

11. A power factor correction device comprising:
    a first switch switching input power to adjust a phase difference between a current and a voltage of the input power;
    a second switch switched on before the first switch is switched on so as to form a transfer path for residual power in the first switch;
    a first inductor connected between a power input terminal for supplying the input power and the first switch; and
    a second inductor connected between a connection terminal between the first switch and the first inductor, and the second switch,
    wherein the first inductor and the second inductor are inductively coupled.

12. A power factor correction method by a power correction device, the power correction device including a first switch and a first inductor coupled to each other, in combination forming a power transfer path to an output device, and a second switch and a second inductor coupled to each other, in combination forming a residual power flow path, the method comprising:
    switching on the second switch to bypass a residual power in the power transfer path to the ground;
    then switching on the first switch for discharging power received from a power source to the output device via the power transfer path ; and
    switching off the second switch after the first switch is switched on, wherein the first inductor and the second inductor are inductively coupled.

13. The method of claim 12, wherein the first inductor charges and discharges energy according to switching of the first switch, and the second inductor adjusts an amount of current flowing through the second switch.

\* \* \* \* \*